United States Patent
Shin et al.

(10) Patent No.: US 9,572,112 B2
(45) Date of Patent: *Feb. 14, 2017

(54) COMBINED OPEN LOOP/CLOSED LOOP METHOD FOR CONTROLLING UPLINK POWER OF A MOBILE STATION

(71) Applicant: InterDigital Technology Corporation, Wilmington, DE (US)

(72) Inventors: Sung-Hyuk Shin, Northvale, NJ (US); Zinan Lin, Basking Ridge, NJ (US); Donald M. Grieco, Manhasset, NY (US); Robert L. Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,244

(22) Filed: Jan. 22, 2016

(65) Prior Publication Data
US 2016/0135131 A1 May 12, 2016

Related U.S. Application Data

(63) Continuation of application No. 14/669,805, filed on Mar. 26, 2015, now Pat. No. 9,271,240, which is a
(Continued)

(51) Int. Cl.
*H04W 52/24* (2009.01)
*H04W 52/10* (2009.01)
(Continued)

(52) U.S. Cl.
CPC ........... *H04W 52/146* (2013.01); *H04W 52/06* (2013.01); *H04W 52/08* (2013.01); *H04W 52/10* (2013.01); *H04W 52/242* (2013.01)

(58) Field of Classification Search
CPC ...... H04W 52/10; H04W 52/06; H04W 52/08; H04W 52/146; H04W 52/242
See application file for complete search history.

(56) References Cited

U.S. PATENT DOCUMENTS

| | | | |
|---|---|---|---|
| 6,600,772 B1 * | 7/2003 | Zeira | H04W 52/08 370/342 |
| 7,205,842 B2 * | 4/2007 | Gustavsson | H04W 52/08 330/279 |

(Continued)

FOREIGN PATENT DOCUMENTS

| | | |
|---|---|---|
| EP | 0972359 | 2/2003 |
| EP | 1551112 | 7/2005 |

(Continued)

OTHER PUBLICATIONS

"3rd Generation Partnership Project, Technical Specification Group Radio Access Network, Physical layer aspects for evolved Universal Terrestrial Radio Access (UTRA) (Release 7)", 3GPP TR 25.814 V7.1.0, Sep. 2006, 132 pages.
(Continued)

*Primary Examiner* — Bobbak Safaipour
(74) *Attorney, Agent, or Firm* — Julian F. Santos

(57) ABSTRACT

A method and apparatus are disclosed comprising a combined open loop/closed loop uplink power control scheme for E-UTRA. The combined open and closed loop method for UL intra-cell PC controls the wireless transmit receive unit (WTRU) transmit power spectral density (PSD), $PSD_{Tx}$, (e.g. power per RB).

24 Claims, 8 Drawing Sheets

Related U.S. Application Data continuation of application No. 14/329,165, filed on Jul. 11, 2014, now Pat. No. 9,026,169, which is a continuation of application No. 13/936,846, filed on Jul. 8, 2013, now Pat. No. 8,812,048, which is a continuation of application No. 12/044,569, filed on Mar. 7, 2008, now Pat. No. 8,509,836.

(60) Provisional application No. 60/893,575, filed on Mar. 7, 2007, provisional application No. 60/895,561, filed on Mar. 19, 2007, provisional application No. 60/945,286, filed on Jun. 20, 2007.

(51) Int. Cl.
*H04W 52/14* (2009.01)
*H04W 52/08* (2009.01)
*H04W 52/06* (2009.01)

(56) References Cited

U.S. PATENT DOCUMENTS

| | | | | |
|---|---|---|---|---|
| 7,269,436 | B2 * | 9/2007 | Won | H04W 52/42 342/372 |
| 7,570,968 | B2 * | 8/2009 | Huh | H04W 52/10 370/280 |
| 7,580,723 | B2 * | 8/2009 | Schwent | H03G 3/3047 455/522 |
| 7,590,181 | B2 * | 9/2009 | Awad | H04L 1/0003 332/108 |
| 7,738,908 | B2 * | 6/2010 | Huh | H04W 52/10 370/280 |
| 7,885,678 | B2 * | 2/2011 | You | H04W 52/228 370/318 |
| 7,899,486 | B2 * | 3/2011 | You | H04W 52/228 370/318 |
| 8,498,663 | B2 | 7/2013 | Higuchi et al. | |
| 8,509,836 | B2 * | 8/2013 | Shin | H04W 52/08 370/318 |
| 8,812,048 | B2 * | 8/2014 | Shin | H04W 52/08 370/318 |
| 9,026,169 | B2 * | 5/2015 | Shin | H04W 52/08 370/318 |
| 9,271,240 | B2 * | 2/2016 | Shin | H04W 52/08 |
| 2002/0168994 | A1 | 11/2002 | Terry et al. | |
| 2003/0002452 | A1 | 1/2003 | Sahota | |
| 2004/0196890 | A1 * | 10/2004 | Zeira | H04W 52/08 375/130 |
| 2004/0253955 | A1 * | 12/2004 | Love | H04B 7/0814 455/442 |
| 2005/0025254 | A1 | 2/2005 | Awad et al. | |
| 2005/0169226 | A1 | 8/2005 | Zeira et al. | |
| 2005/0186981 | A1 | 8/2005 | Nishio | |
| 2005/0213636 | A1 * | 9/2005 | Zeira | H04W 52/08 375/130 |
| 2005/0215276 | A1 | 9/2005 | Koo et al. | |
| 2006/0040619 | A1 * | 2/2006 | Cho | H04W 52/08 455/69 |
| 2006/0046763 | A1 * | 3/2006 | Schwent | H03G 3/3047 455/522 |
| 2006/0073791 | A1 | 4/2006 | Senarath et al. | |
| 2006/0256756 | A1 | 11/2006 | Wakabayashi | |
| 2007/0265026 | A1 * | 11/2007 | You | H04W 52/228 455/522 |
| 2008/0081655 | A1 * | 4/2008 | Shin | H04W 52/08 455/522 |
| 2008/0212701 | A1 * | 9/2008 | Pan | H04B 7/0417 375/260 |
| 2008/0220806 | A1 * | 9/2008 | Shin | H04W 52/08 455/522 |
| 2008/0240208 | A1 * | 10/2008 | Lou | H04B 7/0671 375/211 |
| 2010/0331036 | A1 * | 12/2010 | You | H04W 52/228 455/522 |
| 2011/0096760 | A1 * | 4/2011 | Lee, II | H04W 52/242 370/338 |

FOREIGN PATENT DOCUMENTS

| | | |
|---|---|---|
| EP | 1855391 | 11/2007 |
| EP | 1710960 | 12/2008 |
| JP | 2003-008507 | 1/2003 |
| JP | 2004-186969 | 7/2004 |
| JP | 2004-538665 | 12/2004 |
| JP | 2005-502233 | 1/2005 |
| JP | 2005-536159 | 11/2005 |
| JP | 2006-140650 | 6/2006 |
| JP | 2007-28568 | 2/2007 |
| JP | 2007-053747 | 3/2007 |
| WO | WO-00/03499 | 1/2000 |
| WO | WO-00/57574 | 9/2000 |
| WO | WO-03/001701 A2 | 1/2003 |
| WO | WO-2004/019543 | 3/2004 |
| WO | WO-2006/015983 | 2/2006 |
| WO | WO-2007/020070 | 2/2007 |
| WO | WO-2008/042187 | 4/2008 |

OTHER PUBLICATIONS

"3rd Generation Partnership Project; Technical Specification Group Radio Access Network; Enhanced uplink; Overall description; Stage 2 (Release 7)", 3GPP TS 25.319 V7.1.0, Sep. 2006, 42 pages.

"3rd Generation Partnership Project; Technical Specification Group Radio Access Network; Evolved Universal Terrestrial Radio Access (E-UTRA); Physical Layer Procedures (Release 8)", 3GPP TS 36.213 V8.1.0, Nov. 2007, 17 pages.

"3rd Generation Partnership Project; Technical Specification Group Radio Access Network; Evolved Universal Terrestrial Radio Access (E-UTRA); Radio Resource Control (RRC); Protocol Specification (Release 8)", 3GPP TS 36.331 V8.0.0, Dec. 2007, 56 pages.

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.1.0, Sep. 2006, 56 pages.

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.2.0, Jun. 2007, 64 pages.

"3rd Generation Partnership Project; Technical Specification Group Radio Access Network; Medium Access Control (MAC) protocol specification (Release 6)", 3GPP TS 25.321 V6.11.0, Dec. 2006, 91 pages.

"3rd Generation Partnership Project; Technical Specification Group Radio Access Network; Physical layer procedures (FDD) (Release 7)", 3GPP TS 25.214 V7.3.0, Dec. 2006, 60 pages.

"3rd Generation Partnership Project; Technical Specification Group Radio Access Network; Physical layer procedures (FDD) (Release 7)", 3GPP TS 25.214 V7.7.0, Nov. 2007, 85 pages.

"3rd Generation Partnership Project; Technical Specification Group Radio Access Network; Physical layer procedures (FDD) (Release 8)", 3GPP TS 25.214 V8.0.0, Nov. 2007, 87 pages.

"3rd Generation Partnership Project; Technical Specification Group Radio Access Network; Physical Layer Procedures (Release 8)", 3GPP TS 36.213 V0.2.1, Oct. 2006, 13 pages.

"A Simple Framework for Uplink Power Control", 3GPP Tdoc R1-070978, 3GPP TSG RAN WG1 Meeting #48, St. Louis, USA, Feb. 12-16, 2007, 4 pages.

"Analysis of Inter-cell Power Control for Interference Management in E-UTRA UL", 3GPP Tdoc R1-062705, 3GPP TSG-RAN WG1 Meeting #46bis, Seoul, Korea, Oct. 9-13, 2006, 17 pages.

"Canadian Office Action", Canadian Patent Application No. 2,680,153, Feb. 27, 2012, 3 pages.

(56) References Cited

OTHER PUBLICATIONS

"Combined Open Loop/Closed Loop Uplink Power Control with Interference Mitigation for EUTRA", 3GPP Tdoc R1-071100, 3GPP TSG RAN WG1 Meeting #48, St. Louis, USA, Feb. 12-16, 2007, 7 pages.
"Communication Pursuant to Art. 94(3)", EP Patent Application No. 12158263.9, Mar. 18, 2013, 5 pages.
"Fast Transmission Power Control in E-UTRA", 3GPP Tdoc R1-061668, 3GPP TSG RAN WG1 LTE Ad Hoc Meeting, Cannes, France, Jun. 27-30, 2006, 6 pages.
"Interference Mitigation via Power Control and FDM Resource Allocation and UE Alignment for E-UTRA Uplink and TP", 3GPP Tdoc R1-060401, 3GPP TSG RAN1 Meeting #44, Denver, USA, Feb. 13-17, 2006, 6 pages.
"JP 2003-008507", Patent Abstracts of Japan, Jan. 10, 2003, 1 page.
"JP 2004-186969", Patent Abstracts of Japan, Jul. 2, 2004, 1 page.
"JP 2007-053747", Patent Abstracts of Japan, Mar. 1, 2007, 1 page.
"Official Notice of Rejection", Japanese Application No. 2014-002436, Sep. 30, 2014, 3 pages.
"Official Notice of Rejection (English Translation)", Japanese Application No. 2014-002436, Sep. 30, 2014, 3 pages.
"Official Notice of Rejection", Japanese Patent Application No. 2009-552754, Feb. 14, 2012, 3 pages.
"Official Notice of Rejection (English Translation)", Japanese Patent Application No. 2009- 552754, Feb. 14, 2012, 2 pages.
"Proposals on Ul Tpc parameters for LTE RF co-existence studies", 3GPP Tdoc R4-060904, TSG-RAN Working Group 4 Meeting #40, Tallinn, Estonia, Aug. 28-Sep. 1, 2006, 4 pages.
"System Performance Evaluation of Combined Open Loop/Closed Loop Uplink Power Control for e-UTRA", 3GPP Tdoc R1-070167, 3GPP TSG RAN WG1 Meeting #47bis, Sorrento, Italy, Jan. 15-19, 2007, 7 pages.
"System Performance Evaluation of Uplink Power Control for E-UTRA", 3GPP Tdoc R1-071464, 3GPP TSG RAN WG1 Meeting #48bis, St. Julian's, Malta, Mar. 26-30, 2007, 8 pages.
"Taiwanese Examination Notification", Taiwanese Patent Application No. 097108213, Nov. 25, 2013, 7 pages.
"Taiwanese Examination Notification (English Translation)", Taiwanese Patent Application No. 097108213, Nov. 25, 2013, 5 pages.
"Uplink power control", 3GPP Tdoc R1-060297, 3GPP TSG RAN WG1 #44 Meeting, Denver, USA, Feb. 13-17, 2006, 2 pages.
Interdigital Communications Corp, "Combined Open Loop/Closed Loop Uplink Power Control with Interference Mitigation for E-UTRA", 3GPP Tdoc R1-063465, 3GPP TSG RAN WG1 Meeting #47, Riga, Latvia, Nov. 6-10, 2006, 6 pages.
Interdigital Communications Corp, "E-UTRA Uplink Power Control Proposal and Evaluation", 3GPP Tdoc R1-072781, 3GPP TSG RAN WG1 Meeting #49bis, Orlando, USA, Jun. 25-29, 2007, 14 pages.
LG Electronics, "Modifications of Uplink Synchronous HARQ scheme", 3GPP Tdoc R1070926 (Resubmission of R1-070245), 3GPP TSG RAN WG1 Meeting #48, St. Louis, USA, Feb. 12-16, 2007, 5 pages.
Motorola, "Uplink Power Control for E-UTRA", 3GPP Tdoc R1-070795, 3GPP TSG RAN1 Meeting #48, St. Louis, USA, Feb. 12-16, 2007, 4 pages.
Nokia, "Power control email discussion summary", 3GPP Tdoc R1-071009, 3GPP TSG RAN WG1 Meeting #48, St. Louis, USA, Feb. 12-16, 2007, 2 pages.
Motorola, "Uplink Power Control for E-UTRA", 3GPP Tdoc R1-062612, 3GPP TSG RAN1 #46bis, Seoul, Korea, Oct 9-13, 2006, 3 pages.
Motorola, "Uplink Power Control for E-UTRA", 3GPP Tdoc R1-063063, 3GPP TSG RAN1 #47, Riga, Latvia, Nov 6-10, 2006, 4 Pages.
Nokia, "Data-non-associated control signal transmission with UL data", 3GPP Tdoc R1-071000, 3GPP TSG RAN WG1 Meeting #48, St. Louis, USA, Feb 12-16, 2007, 5 pages.
"First Notification of Office Action", Chinese Patent Application No. 201410171962.6, Nov. 23, 2016, 11 pages.
"First Notification of Office Action (English Translation)", Chinese Patent Application No. 201410171962.6, Nov. 23, 2016, 13 pages.
"Official Notice of Rejection", Japanese Patent Application No. 2015-251968, Oct. 25, 2016, 3 pages.
"Official Notice of Rejection (English Translation)", Japanese Patent Application No. 2015-251968, Oct. 25, 2016, 3 pages.
"English Language Abstract ", Japanese Patent Application No. 2006-140650, Jun. 1, 2006, 2 pages.
InterDigital Communications Corp, "Combined Open Loop/Closed Loop Uplink Power Control with Interference Mitigation for E-UTRA", 3GPP Tdoc R1-070166, 3GPP TSG RAN WG1 #47, Sorrento, Italy, Jan 15-19, 2007, 7 pages.

\* cited by examiner

COMBINED OPEN LOOP/CLOSED LOOP METHOD FOR CONTROLLING UPLINK POWER OF A MOBILE STATION

CROSS REFERENCE TO RELATED APPLICATIONS

This application is a continuation of U.S. patent application Ser. No. 14/669,805, filed Mar. 26, 2015; which is a continuation of U.S. patent application Ser. No. 14/329,165, filed Jul. 11, 2014, now U.S. Pat. No. 9,026,169; which is a continuation of U.S. patent application Ser. No. 13/936,846, filed Jul. 8, 2013, now U.S. Pat. No. 8,812,048; which is a continuation of U.S. patent application Ser. No. 12/044,569, filed on Mar. 7, 2008, now U.S. Pat. No. 8,509,836; which claims the benefit of U.S. Provisional Application Ser. No. 60/893,575, filed on Mar. 7, 2007, U.S. Provisional Application Ser. No. 60/895,561, filed Mar. 19, 2007 and U.S. Provisional Application Ser. No. 60/945,286, filed Jun. 20, 2007. Each of the foregoing applications are incorporated by reference as if fully set forth.

FIELD OF INVENTION

The present invention is related to wireless communication systems.

BACKGROUND

For the evolved universal terrestrial radio access (E-UTRA) uplink (UL), there are several transmit power control (TPC) proposals that were submitted to third generation partnership project (3GPP) long term evolution (LTE) Work Group 1 (WG1). These proposals can be generally divided into (slow) open loop TPC and slow closed loop or channel quality information (CQI)-based TPC.

Open loop TPC is based on pathloss measurement and system parameters where the pathloss measurement is performed at a wireless transmit/receive unit (WTRU) and the system parameters are provided by an evolved Node-B (eNodeB).

Closed loop TPC is typically based on TPC feedback information, (such as a TPC command), that is periodically sent from the eNodeB where the feedback information is generally derived using signal-to-interference noise ratio (SINR) measured at the eNodeB.

Open loop TPC can compensate for long-term channel variations, (e.g. pathloss and shadowing), in an effective way, for instance, without the history of the transmit power. However, open loop TPC typically results in pathloss measurement errors and transmit power setting errors. On the other hand, slow closed loop or CQI-based TPC is less sensitive to errors in measurement and transmit power setting, because it is based on feedback signaled from the eNodeB. However, slow closed loop or CQI-based TPC degrades performance when there is no available feedback due to UL transmission pause, or pauses in the feedback transmission or channel variations are severely dynamic.

For the UL E-UTRA, there are several intra-cell PC proposals, which have been submitted to third generation partnership project (3GPP) long term evolution (LTE) work group (WG)#1. These proposals can be generally divided into slow open loop PC and slow closed loop, (or CQI based PC). Open loop PC can compensate for long-term channel variations, (e.g., pathloss and shadowing), in an effective way, for instance, without the history of the transmit power, but it typically suffers from errors in pathloss measurement and transmit power setting. On the other hand, slow closed loop or CQI based PC is less sensitive to errors in measurement and transmit power setting, because it is based on feedback signaled from the eNodeB. However, it degrades performance when there is no available feedback due to UL transmission pause or pauses in the feedback transmission.

As such there exists a need for an improved method of transmission power control.

SUMMARY

A method and apparatus are disclosed comprising a combined open loop/closed loop uplink power control scheme for E-UTRA. The combined open and closed loop method for UL intra-cell PC controls the wireless transmit receive unit (WTRU) transmit power spectral density (PSD), $PSD_{Tx}$, (e.g. power per RB).

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
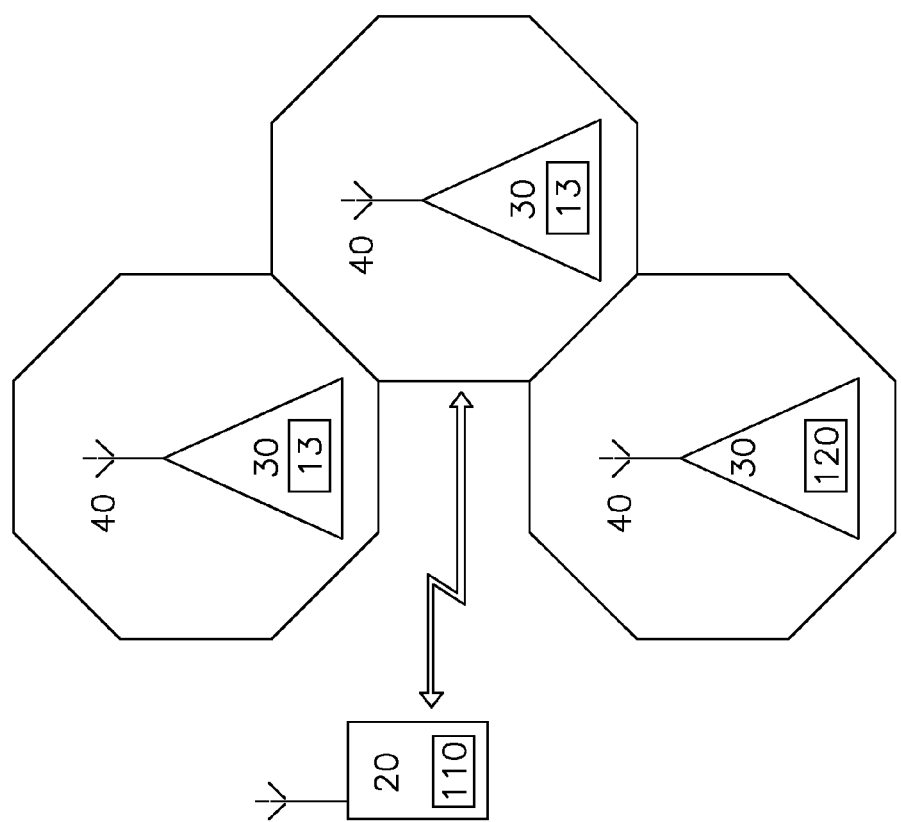
FIG. 1 is an example wireless communication system.

FIG. 1 shows an example wireless communication network (NW) 10 comprising a WTRU 20, one or more Node Bs 30, and one or more cells 40. Each cell 40 comprises one or more Node Bs (NB or eNB) 30 including a transceiver 120 configured to implement a disclosed method of transmit power control (TPC). WTRU 20 comprises a transceiver 110 also configured to implement the disclosed TPC method.

Figure 2:
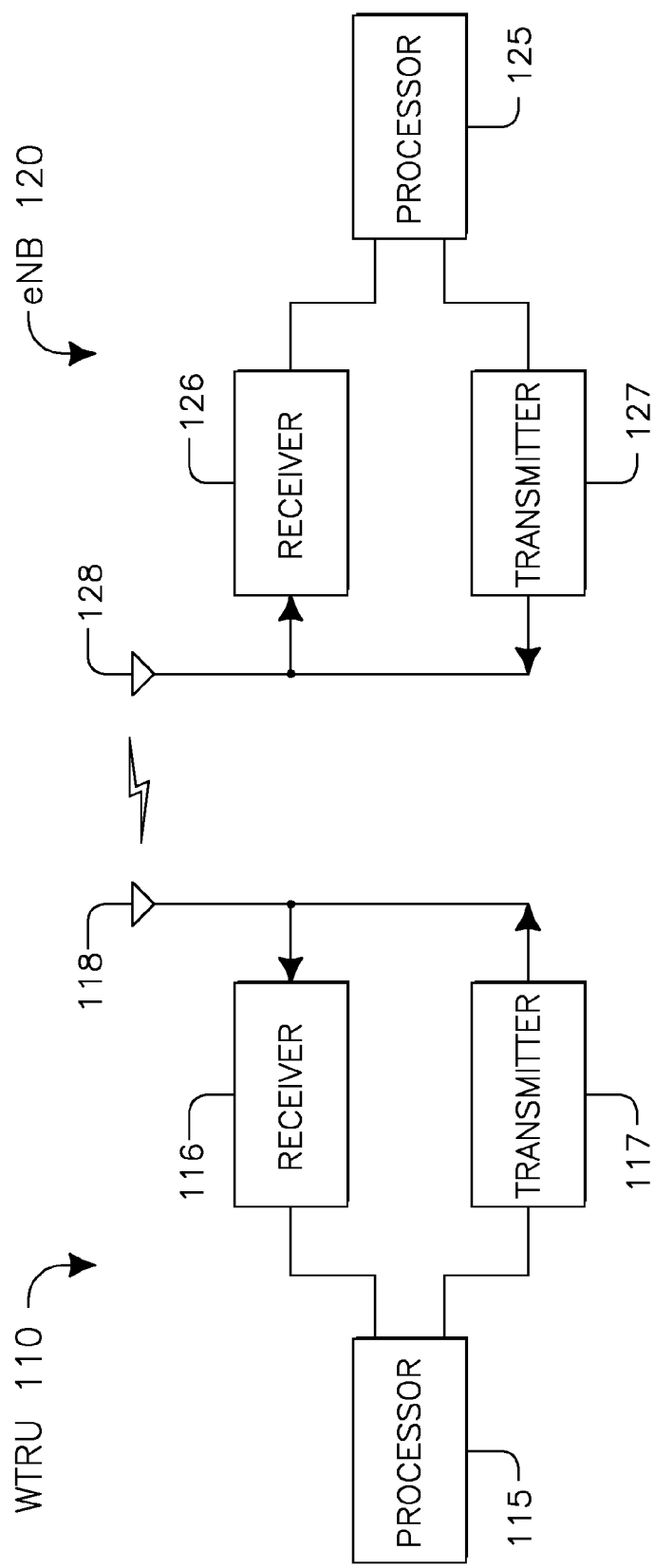
FIG. 2 is an example block diagram of a transmitter and receiver configured to implement the disclosed power control (PC) method.

FIG. 2 is a functional block diagram of transceivers 110, 120 configured to perform the disclosed method. In addition to components included in a typical transmitter/receiver, i.e., a WTRU or Node-B, transceivers 110, 120 include processors 115, 125, receivers 116, 126 in communication with processors 115, 125, transmitters 117, 127 in communication with processors 115, 125 and antenna 118, 128 in communication with receivers 116, 126 and transmitters 117, 127 to facilitate the transmission and reception of wireless data. Additionally, the receiver 126, transmitter 127 and antenna 128 may be a single receiver, transmitter and antenna, or may include a plurality of individual receivers, transmitters and antennas, respectively. Transmitter 110 may be located at a WTRU or multiple transmitting circuits 110 may be located at a base station. Receiver 120 may be located at either the WTRU, Node B, or both.

The disclosed method of TPC comprises a combined open loop and closed loop scheme for uplink (UL) intra-cell power control. The method comprises controlling the WTRU transmit power spectral density (PSD) or PSD transmit ($PSD_{Tx}$), e.g., power per resource block (RB), or the WTRU transmit power using open loop and a-periodic closed loop power control (PC) for both UL data channel control channels and sound reference symbols (SRS). UL channel quality indicator (CQI) (or Modulation Coding Set (MCS)/grant information) is used at the WTRU to correct open loop and/or measurement errors, assuming the UL MCS/grant represents the signal to interference and noise ratio (SINR) received at the Node-B. If no CQI is available, then only the open loop is conducted. Implicit command signaling, e.g. no signaling overhead, for the closed loop component can be used. Alternatively, exploit TPC command signaling in DL control channel can be used for the closed loop component. Additionally, the disclosed method is capable of correcting open loop errors quickly, resulting in good performance.

The disclosed method, as indicated above, comprises controlling the WTRU transmit power spectral density (PSD) or PSD transmit ($PSD_{Tx}$), e.g., power per resource block (RB) or transmit power. It should be noted that although the disclosed method includes controlling the transmit PSD, it is equivalent to controlling the transmit power. $PSD_{Tx}$ is defined as:

$$PSD_{Tx} = PSD_{open} + \alpha \cdot \Delta_{closed} + \Delta_{MCS}; \quad \text{Equation (1)}$$

where $PSD_{open}$ represents pathloss based open loop PSD in dBm; $\Delta_{closed}$ is a power correction factor which is determined based on the closed loop component, to be disclosed in detail hereinafter; $\Delta_{MCS}$ is a power offset per granted MCS; and $\alpha$ is a weighting factor to enable ($\alpha=1$) or disable ($\alpha=0$) the closed loop component, depending on the availability of the downlink (DL) control channel, which embeds closed loop PC (correction) command signaling (explicitly or implicitly). The weighting factor may be determined by WTRU 20 via autonomously detecting the presence of the closed loop PC command signaling. Alternatively, WTRU 20 is informed via higher signaling from eNodeB 30 with regard to where the command signaling exists. The transmit PSD should not exceed the maximum transmit PSD, $PSD_{max}$, where $PSD_{max}$ is derived based on the maximum allowed power, $P_{max}$, that depends on the UE power class, such as $PSD_{max} = P_{max}/M$ where M is the size of the UL channel resource assignment expressed in number of resource blocks valid for a given subframe.

The proposed intra-cell PC scheme in Equation (1) may use an absolute power correction factor compared to the open loop based PSD. From Equation (1), the WTRU Tx PSD at the nth update instance can be expressed as:

$$PSD_{Tx}(n) = PSD_{open}(n) + \alpha \cdot \Delta_{closed}(n) + \Delta_{MCS}(n) \quad \text{Equation (2)}$$
$$= PSD'_{Tx}(n-1) + (PSD_{open}(n) - PSD_{open}(n-1)) +$$
$$\alpha \cdot (\Delta_{closed}(n) - \Delta_{closed}(n-1)) + \Delta_{MCS}(n);$$

where $PSD'_{Tx}(n-1)$ represents the $(n-1)^{th}$ Tx PSD without the power offset per granted MCS, which is given by $PSD'_{Tx}(n-1) = PSD_{Tx}(n-1) - \Delta_{MCS}(n-1)$.

Typically, the power offsets for the individual granted MCS are known by both the WTRU and the eNodeB.

Processor 115 of WTRU 20 combines pathloss based open loop and closed loop PC to determine $PSD_{Tx}$. In accordance with the disclosed method, WTRU 20 first performs open loop PC based on path loss measurement and system parameters ($PSD_{open}$). $PSD_{open}$ is calculated as follows:

$$PSD_{open} = PSD_{target} + \bar{L} \text{ (dBm);} \quad \text{Equation (3)}$$

where
  $PSD_{target}$ is a target PSD received at serving eNodeB 30, which is preferably a WTRU (or a sub-group of WTRUs)-specific parameter. The target PSD may be adjusted through an outer loop mechanism according to Quality of Service (QoS) (e.g., target block error rate (BLER)), and also a function of the pathloss measurement, to compensate for a fraction of the pathloss. The signaling of the target PSD target is done via higher layer signaling from Node B 30 to WTRU 20 upon adjustment on a slow rate basis; and
  $\bar{L}$ is the filtered pathloss in dB, including shadowing, from serving eNodeB 30 to WTRU 20, where WTRU 20 first measures the instantaneous pathloss based on the DL reference signal (RS) whose transmit power is known. WTRU 20 then applies a filtering method to the pathloss. For example, the filtered pathloss at the k-th instance, $\bar{L}_k$, can be calculated as $$\bar{L}_k = \rho \cdot \bar{L}_{k-1} + (1-\rho) \cdot L_k; \quad \text{Equation (4)}$$

where $\bar{L}_{k-1}$ and $\bar{L}_k$ represent the filtered pathloss at the (k−1)-th instance and instantaneous pathloss at the k-th instance; $\rho$ is a filter coefficient, $0 \le \rho \le 1$, which is generally determined by WTRU 20, depending on pathloss variation, fast fading rate, the time of UL transmission, and others, for example. The filtering for pathloss can be done in PHY layer and/or L 2/3 layer.

Once WTRU 20 determines the open loop component, processor 115 calculates the closed loop component. As those having skill in the art know, there are open loop related errors, including the pathloss estimation error due to non-perfect reciprocity in UL and DL in FDD and the WTRU Tx impairment due to non-linear power amplifier. To compensate for such errors and to maintain the quality of the power controlled channel along with the target quality, the WTRU applies a correction to the open loop based PSD in a form of closed loop PC as in Equation (1), (or Equation (2)).

Serving eNodeB 30 determines a WTRU specific (absolute and/or accumulated) PC correction command for each UL scheduled WTRU (or a sub-group of scheduled WTRUs). Preferably, eNodeB 30 uses the power controlled data channel as a reference for the correction command. The resulting correction command is signaled to WTRU 20 (or a sub-group of the scheduled WTRUs) through the UL grant, and/or the DL scheduling channel, sent in the DL Layer 1 or Layer 2 control channels. The correction command may be signaled only in the UL grant associated with a particular (predefined) HARQ process, such as every HARQ process 1.

Upon receiving the correction command(s) at WTRU 20, processor 115 of WTRU 20 determines the correction factor, $\Delta_{closed}$, based on the correction command (or accumulated correction commands) set forth as:

$$\Delta_{closed} = f(\text{PC correction command(s)}); \quad \text{Equation (5)}$$

where $\Delta_{closed}$ may take on a set of multiple step levels, for example, $\{+/-4, +/-1 \text{ dB}\}$ using 3 bits of the command.

Alternatively, eNodeB 30 sends to each scheduled WTRU 20 (or a sub-group of scheduled WTRUs) a power correction factor using multiple command bits, such as 3 bits, in the UL grant and possibly in the DL scheduling in the DL control channel, where the correction command is preferably determined based on link quality (such as received PSD or SINR) of the UL power controlled data channel (and possibly UL sounding reference symbol, if available). For example, assuming a set of power correction factor values to be $\{-7, +/-5, +/-3, +/-1, 0 \text{ dB}\}$ with 3 bits, the correction factor may be determined as follow $$\Delta_{closed} = \lfloor \text{ESINR}_{est} - \text{SINR}_{target} \rfloor; \quad \text{Equation (6)}$$

where $\text{ESINR}_{est}$ and $\text{SINR}_{target}$ denotes the effective SINR (ESINR) estimate at the receiver and target SINR, respectively, of the power controlled channel(s) in dB. $\lfloor x \rfloor$ denotes a correction value in the correction set, which is nearest to x. The observed samples at the eNodeB for the ESINR estimation include (some of or all)SC-FDMA symbols of the UL power controlled channel(s), which have been received since the last correction command signaling in DL.

To reduce the command signaling overhead, the correction command is not required in every UL grant (and every DL scheduling if used). That is, the correction command can be sent on a pre-configured signaling time (e.g., in every N grant channel or every N Transmission Time Interval (TTI) where N is a configurable parameter being less than or equal to the minimum UL PC update period).

A correction command signaling timing is configured at eNodeB 30 (or on a RRC level) per WTRU basis and is then known at both eNodeB 30 and WTRU 20 via higher layer signaling.

When the correction command is signaled in the UL grant, assuming that UL HARQ is synchronous, the signaling timing configuration can be simplified such that the command signaling is done in particular UL grants such as the UL grant associated with a pre-defined HARQ process, for example, HARQ process #1. But, even in this case, it is not necessary to signal the correction commands in all the associated UL grant channels. For example, the signaling may occur in every N associated grant channel for N>=1, which would be equivalent to one command signaling in every N HARQ cycle period. The signaling timing (or associated parameters) may be reconfigured on a semi static rate.

Figure 3:
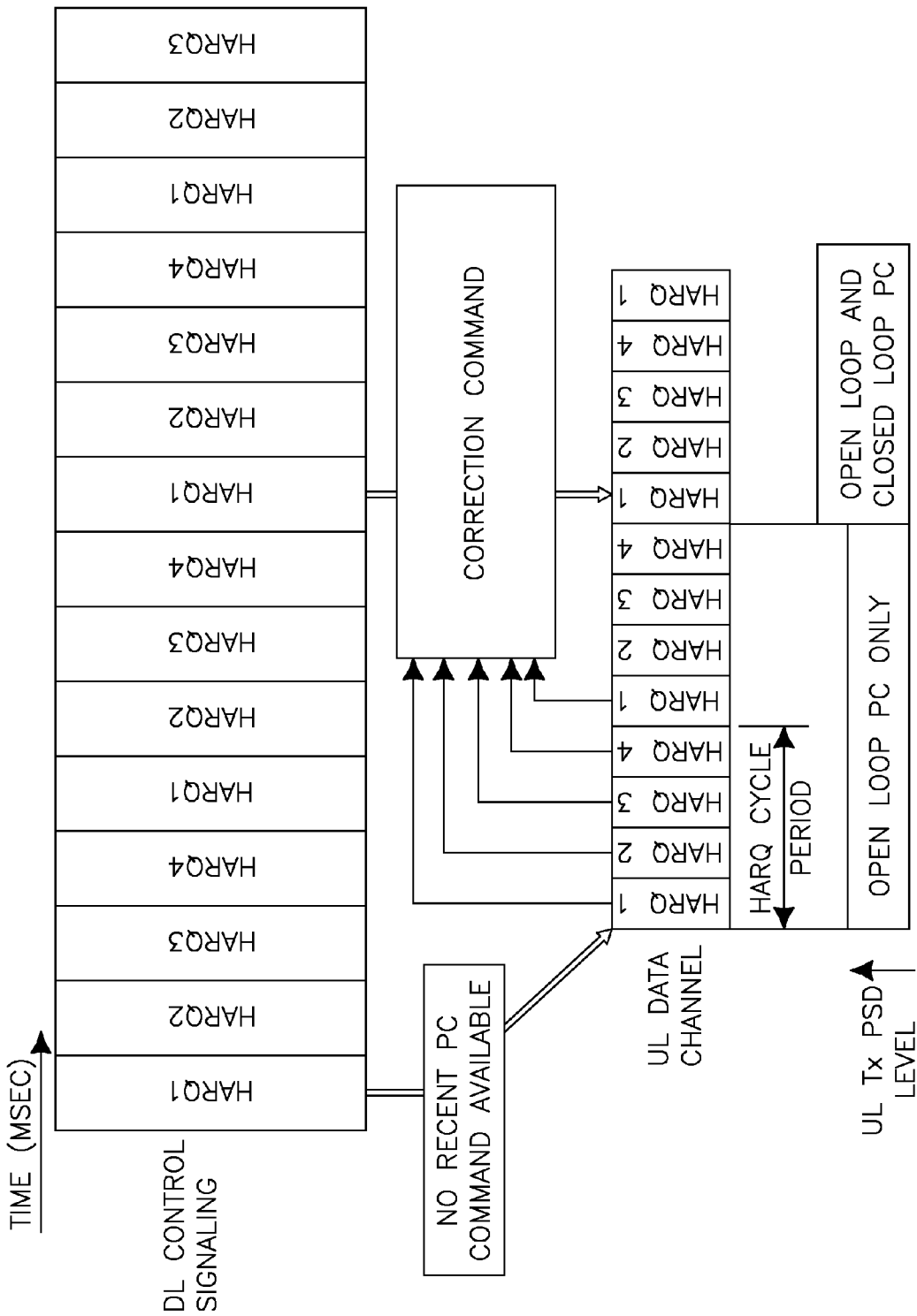
FIG. 3 shows an example of the timing of the disclosed combined PC method.

FIG. 3 shows an example of the disclosed PC method when the PC correction command is conveyed in the UL grant associated with HARQ process #1 and N is set to 2. In this example, the PC update rate is 8 msec, assuming the number of HARQ processes is 4 and the inter-transmission time interval (TTI) is equal to 1.

When WTRU 20 receives one correction command from the serving eNodeB 30 in an UL grant (or possibly accumulated correction commands in multiple UL grants) since the last Tx PSD adjustment, it shall derive a correction factor, $\Delta_{closed}$, from the received correction command (or after combining multiple correction commands if more than one command is received) for the next PSD adjustment.

WTRU 20 then adjusts the transmit PSD of the data channel according to Equation (1) (or Equation (2)) using the derived correction factor, the most recent open loop PSD, and a power offset associated with the granted MCS. The resulting Tx PSD shall be applied to the very beginning (first SC-FDMA symbol) of the next UL TTI for the data channel and remain constant until the next PSD adjustment, as shown in FIG. 3.

Figure 4:
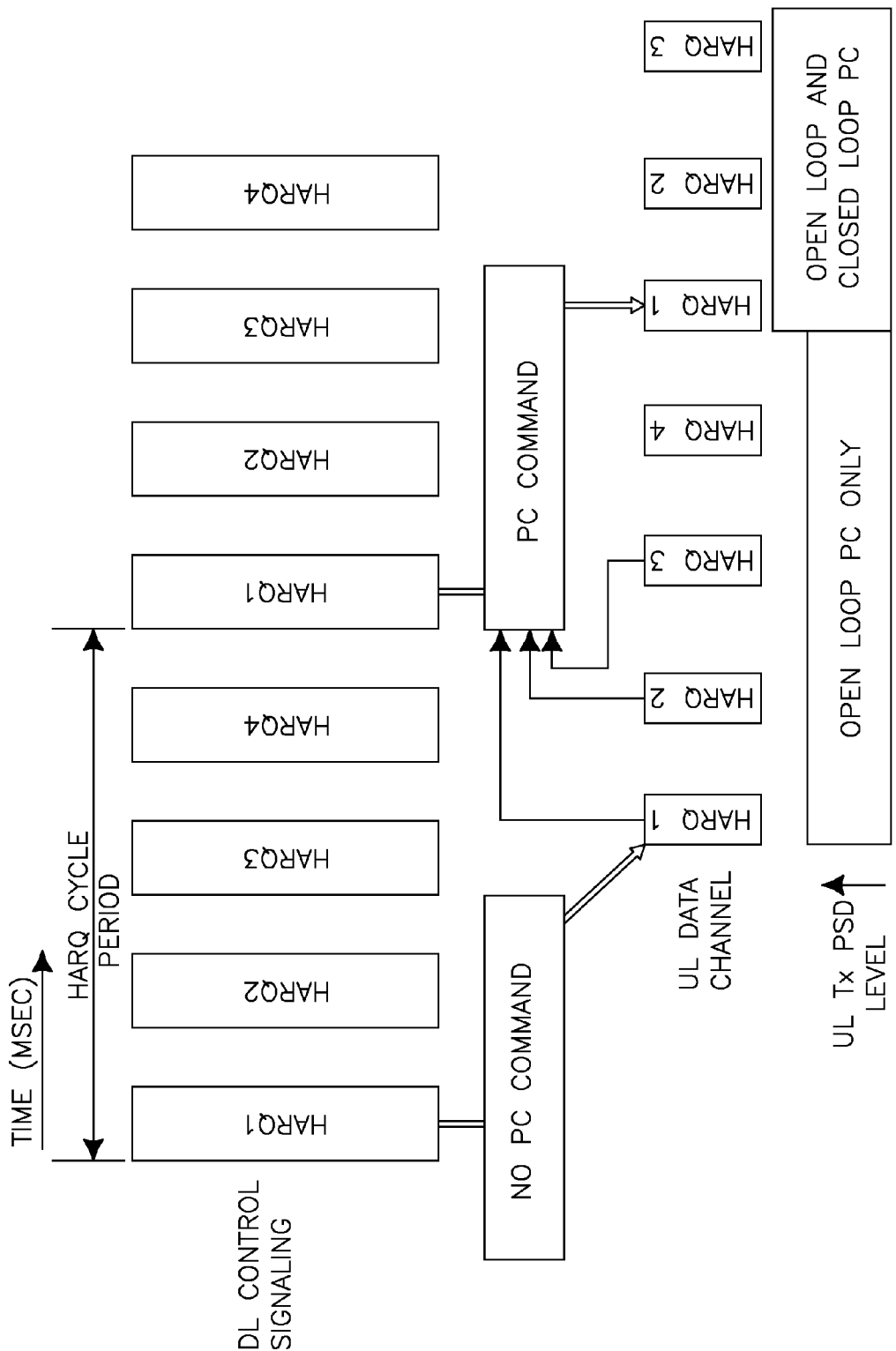
FIG. 4 shows an example of the disclosed combined power control method when inter-TTI is one (1)

FIG. 4 shows an example of the timing of the disclosed combined PC method, assuming that UL HARQ is a synchronous scheme with 4 HARQ processes and that WTRU 20 is scheduled to send a data packet (e.g. a HARQ process) every TTI (e.g, inter-TTI=1). In addition, eNodeB 30 sends a PC correction command only in the UL grant associated with HARQ process 1. In this case, the WTRU Tx power update period is 4 TTIs (e.g., 4 msec).

As illustrated in FIG. 4, in the initial UL transmission, since there may be no PC correct command available, WTRU 20 sets its transmit power based only on the open loop component (i.e., the weighting factor, $\alpha$, is zero in Equation (1)). Before the next HARQ transmission time (one HARQ cycle time), eNodeB 30 sends a correction command in the grant channel in the HARQ process 1 associated DL control channel, where the command was determined based on the link quality (power or SINR) of the first two HARQ processes. If WTRU 20 correctly receives the correction command, WTRU 20 then calculates its transmit $\text{PSD}_{TX}$ based on the combined open loop and closed loop scheme and applies the $\text{PSD}_{TX}$ to the following HARQ processes.

Figure 5:
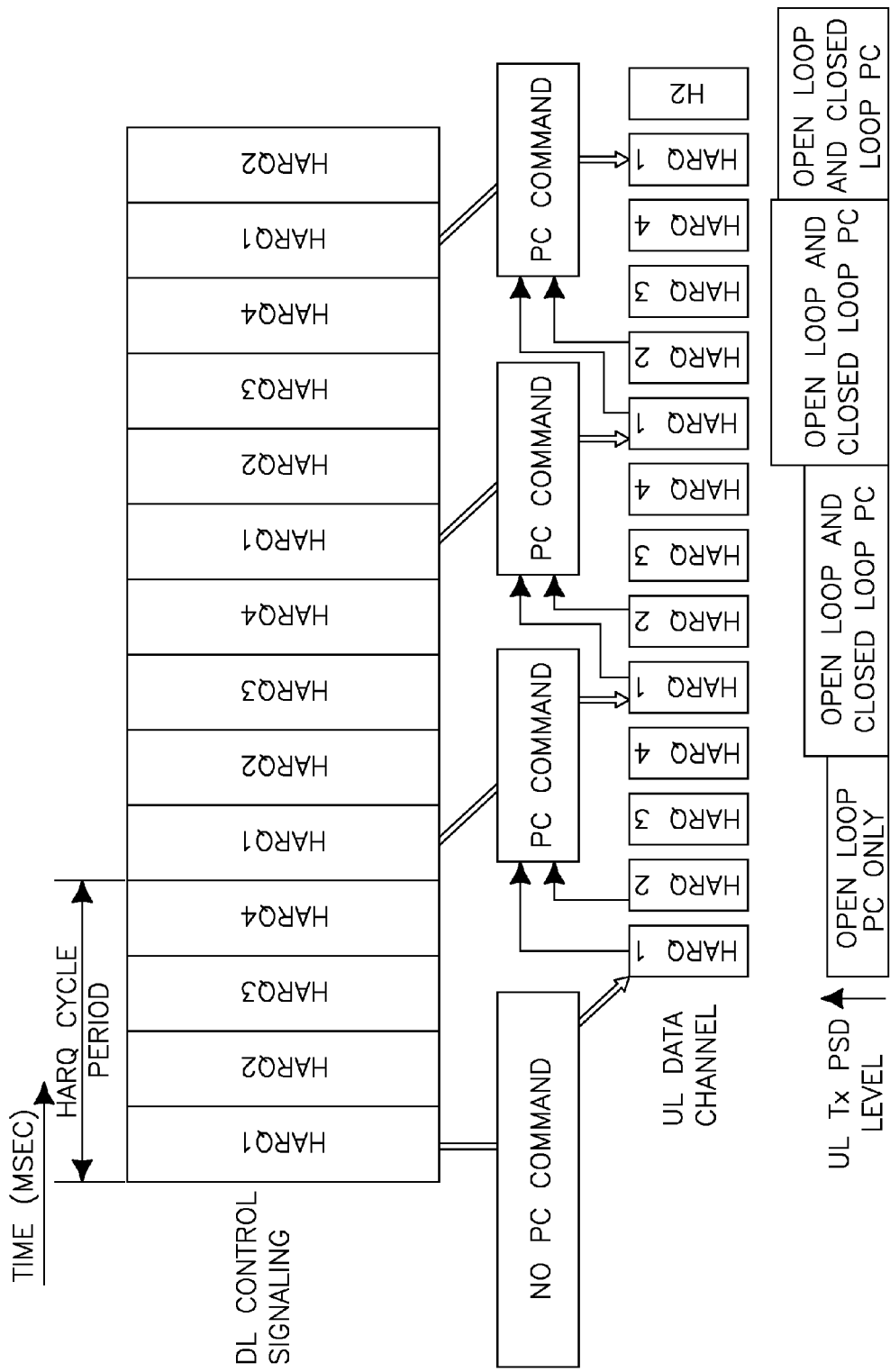
FIG. 5 shows another example of the disclosed combined PC timing when inter-TTI is two (2)

FIG. 5 illustrates another example of the disclosed combined PC timing where inter-TTI is two. In this case, the UL PC update period is 8 TTIs (8 msec).

When there is no recent closed loop correction command (for example, due to recent scheduled UL data transmission, say, UL DTX), WTRU 20 may set its Tx PSD by relying on the open loop. In this case, the weighting factor, $\alpha$, in Equation (1) is set to zero as in the case of initial Tx PSD setting.

Figure 6:
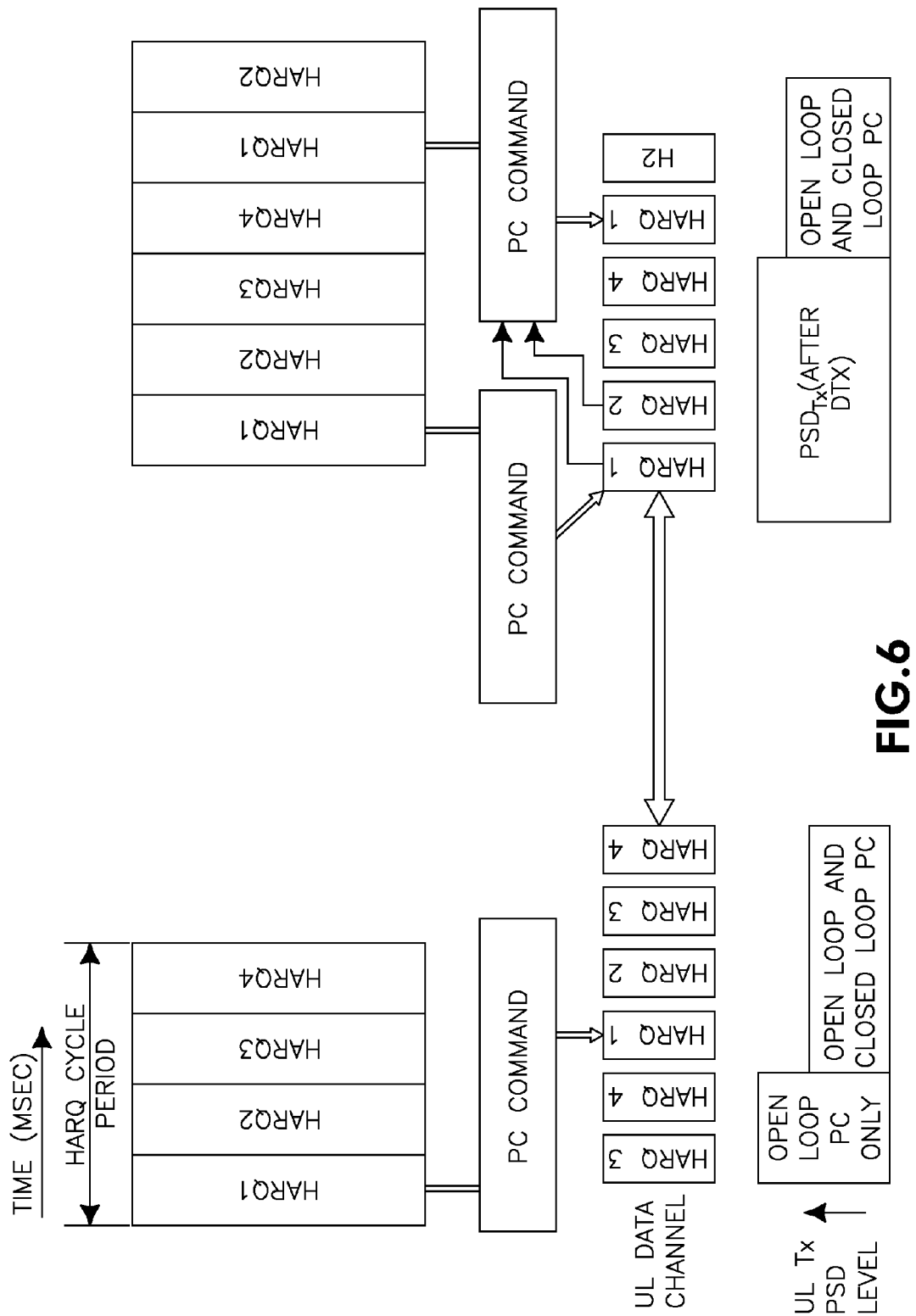
FIG. 6 shows an example of the disclosed combined PC scheme, including discontinuous transmission (DTX)

Alternatively, WTRU 20 may set the Tx PSD based on the pathloss variation between the time before the DTX and the time before resuming the UL transmission. If the UL DTX is short, the WTRU may use Equation (2) by setting $\alpha$ to zero, such that $$\text{PSD}_{Tx}(n) = \text{PSD}'_{Tx}(n-1) + (\text{PSD}_{open}(n) - \text{PSD}_{open}(n-1)) + \Delta_{MCS}(n) \quad \text{Equation (7)}$$

where n is the Tx PSD setting time before resuming the UL transmission and (n−1) is the PSD setting time before the DTX. An example of the timing of this case is shown in FIG. 6.

In another alternative, WTRU 20 may apply a power offset relative to the most recent PSD for physical uplink control channel (PUCCH), if available. Even though there was no UL data transmission, there may be UL control signaling (such as CQI and ACK/NACK) for DL. In this case, since the UL control channel is also power controlled based on Equation (1), (but using different parameters and update rate), the UL control channel Tx PSD for the data channel Tx PSD may be used as follows:

$$\text{PSD}_{Tx}(\text{data}) = \text{PSD}_{Tx}(\text{control}) + \Delta_{control}(\text{data,control}) \quad \text{Equation (8)}$$

where $\text{PSD}_{Tx}(\text{control})$ is the most recent PSD (or PSD averaged over the recent updates) for the UL control channel and $\Delta_{control}(\text{data,control})$ represent the control channel power offset relative to the Tx PSD for data.

If the DTX period is long, then WTRU 20 $PSD_{TX}$ may be determined right after the DTX based on open loop only as is the case of the initial $PSD_{TX}$ setting.

Figure 7:
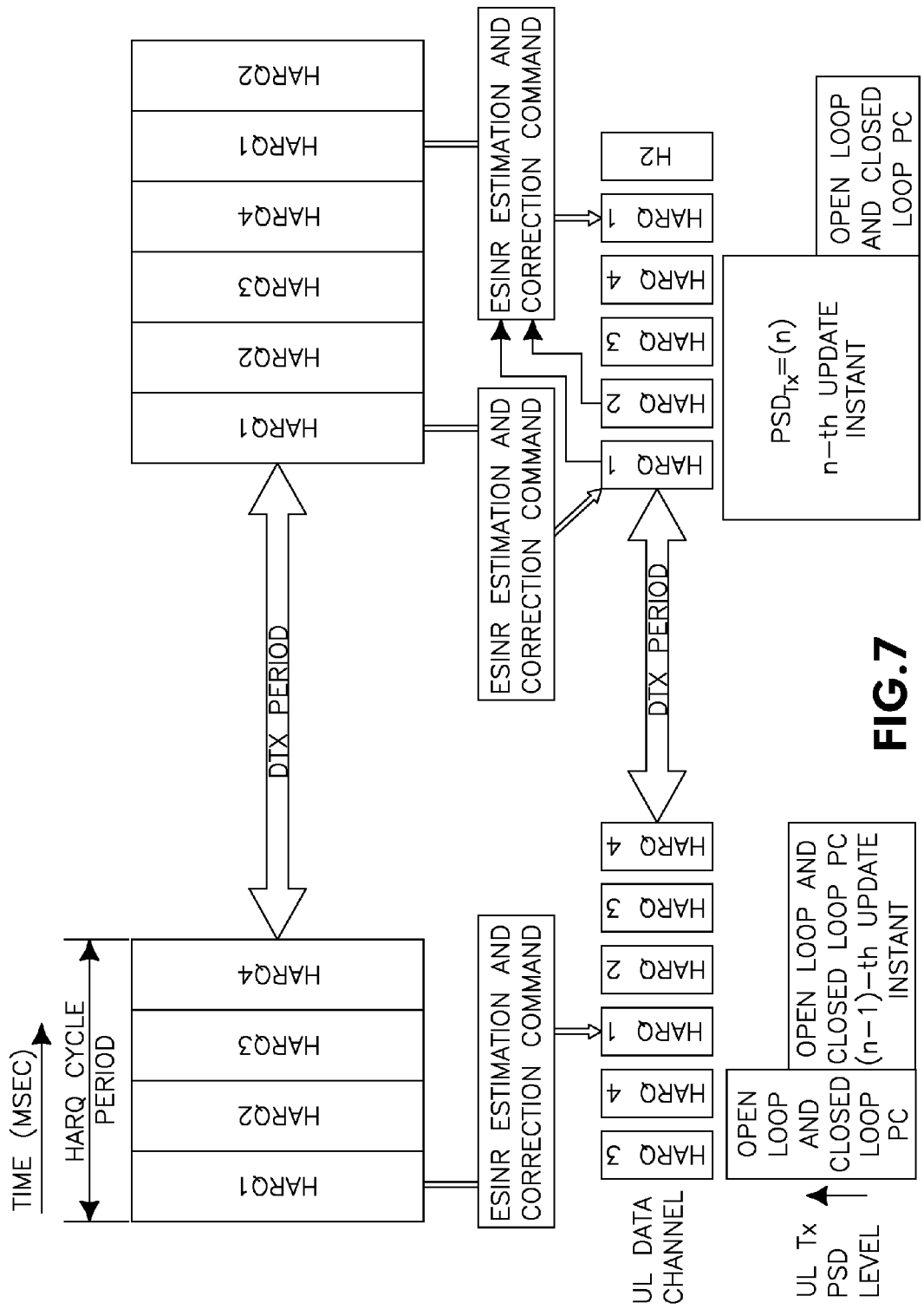
FIG. 7 shows an example of the disclosed PC method for the nth update instant.

FIG. 7 shows an example of the proposed combined PC scheme, including DTX.

Typically, the UL grant assignment (e.g. assigned MCS and TBS) in the DL control channel is tied up with the link quality (such as received PSD or SINR) of the UL data transmission. Another method is disclosed wherein an eNodeB 30 processor 125 may assign the UL grant (MCS and TBS) for WTRU 20 such that the grant assignment represents the link quality (e.g. SINR) received at eNodeB 30. In this case, WTRU 20 may derive its Tx PSD as follows:

$$PSD_{Tx} = PSD_{open} + \alpha \cdot f(\text{UL grant assignment}, SINR_T) + \Delta_{MCS} \text{ (dBm)}; \quad \text{Equation (9)}$$

where $PSD_{open}$, $\alpha$, and, $\Delta_{MCS}$, respectively, are the same as defined above. $f(\text{UL grant assignment}, SINR_T)$ is a correction factor in dB which replaces the power correction factor, $\Delta_{closed}$, in Equation (1). $SINR_T$ is the target SINR in dB. The grant based correction factor, $f(\text{UL grant assignment}, SINR_T)$, can be expressed by the following:

$$f(\text{UL grant assignment}, SINT_T) = SINR_T - E\{SINR_{est} (\text{UL grant assignment})\}; \quad \text{Equation (10)}$$

where $SINR_{est}(\text{UL grant assignment})$ represents the eNodeB received SINR estimate which WTRU 20 derives from the UL grant assignment. $E\{SINR_{est}\}$ denotes the estimated SINR average over time such as $$E\{SINR_{est}(\text{grant}^k)\} = \rho \cdot E\{SINR_{est}(\text{grant}^{k-1})\} \pm (1-\rho) \cdot E\{SINR_{est}(\text{grant}^k)\} \quad \text{Equation (11)}$$

where $\text{grant}^k$ represents the k-th received UL grant assignment and $\rho$ is the averaging filter coefficient, $0 \leq \rho \leq 1$. The estimation of $SINR_{est}$ (UL grant assignment) at the WTRU can be based on a grant (MCS, TBS) mapping table, which is configurable by the network through higher layer signaling on a semi-static basis.

Similar to Equation (1), the correction factor in Equation (8) may be used to compensate for open loop errors. The main advantage to using Equation (8) is that it does not require explicit correction command signaling in the UL grant in the DL L1/L2 control channel (resulting in reduced signaling overhead), while Equation (1) (and Equation (2)) needs the explicit command to be signaled in the UL grant (and/or the DL scheduling). Using Equation (3), the closed loop component may be based on the UL grant assignment (e.g., MCS and/or TBS), without the explicit correction command signaling in the UL grant in the DL L1/L2 control channel.

However, Equation (9) may not be applicable for some cases such as persistent scheduling and grant (e.g. MCS) mismatching (i.e., the assigned MCS does not accurately represent the received SINR). Accordingly, the WTRU Tx PSD setting may be switched between Equation (1) and Equation (8).

Through higher layer correction factor type signaling, wherein eNodeB 30 (or the network 10) signals to WTRU 20 which one (Equation (1) or Equation (8)) is to be used for the WTRU Tx power setting. In this case, it is preferable that the correction factor type signal is configurable by network 10 on a semi-static basis and per WTRU basis.

Alternatively, a one-bit MCS mismatching indicator may be introduced in the DL L1/2 control signaling. For example, bit-1 may indicate to use Equation (1), and bit-0 may be used to indicate Equation (8).

In another alternative, one of the explicit correction command levels may be used to indicate the use of Equation (8). This alternative assumes Equation (1) is the default PC method. As such, eNodeB 30 sets one of the correction command levels in the UL grant to indicate the use of Equation (8). For example, when the correction command in Equation (8) is three-bits long, one of the 8 command level, e.g., '000', is set for WTRU 20 to use Equation (8).

Figure 8:
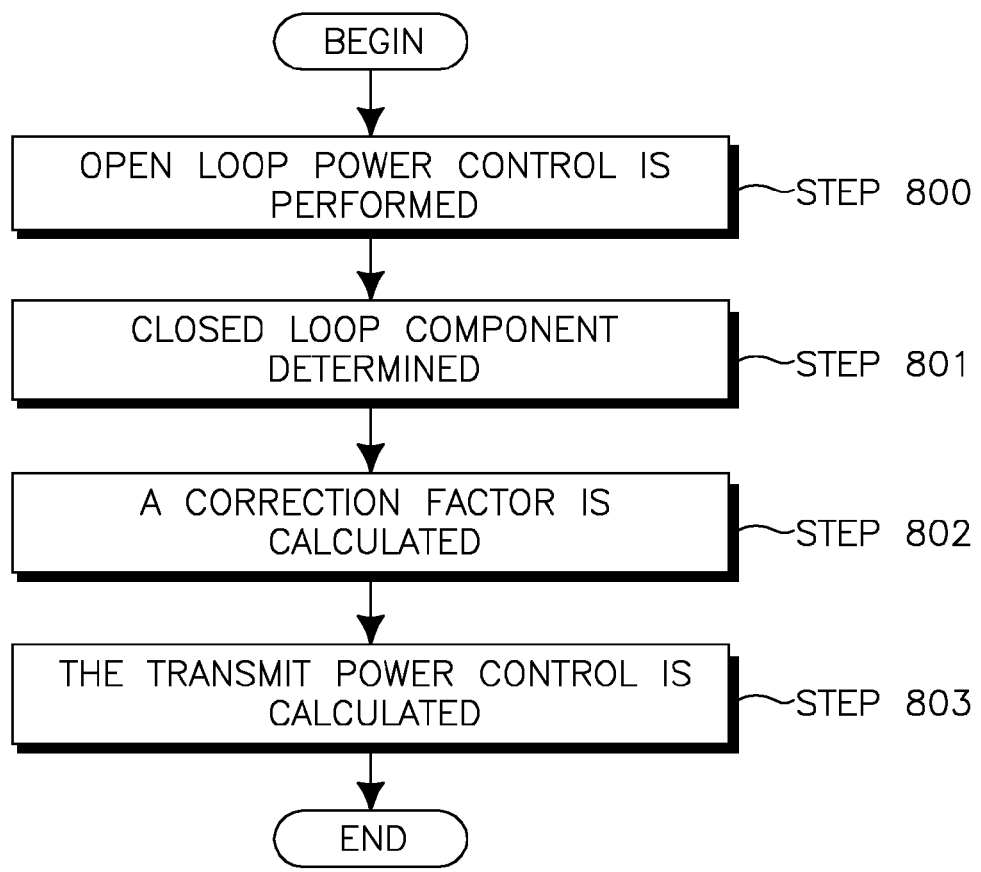
FIG. 8 shows a flow diagram of the disclosed combined open-loop and closed method of determining the TPC.

A flow diagram of the disclosed combined open-loop and closed method of determining the TPC is shown in FIG. 8. Processor 115 of WTRU 20 performs open loop power control based on path loss measurement, by determining a target power spectral density PSD Target (Step 800) and a filtered pathloss (L) (Step 801). WTRU 20 then determines a closed loop component using a power control correction command received at receiver 116 through the UL grant channel (Step 802). Upon receiving the correction command, receiver 116 forwards the correction command to processor 115 for determining a correction factor $\Delta_{closed}$ (Step 803). Processor 115 then calculates a correction factor $\Delta_{closed}$ (Step 804). Processor 115 then combines the open loop PC with the closed loop component to determine the transmit power control. (Step 805).

In a disclosed method of TPC for non-scheduled data (e.g., VoIP), there are several options for the WTRU to set its TX PSD: i) relying on the open loop PSD only, ii) for the closed loop part, the eNodeB transmits UL grants in particular instants (in time) where the UL grant conveys the correction command. In this case, the UL grant format (and/or the correction command format) may be different than that for scheduled data; or iii) applying a power offset relative to the most recent PSD (or PSD averaged over the recent updates) for PUCCH, if available.

$$PSD_{Tx} = \underbrace{P_0 + SINR_{Target} + \alpha \cdot PL}_{PSD_{open}} + \beta \cdot \Delta_{closed} + \Delta_{MCS} \text{(dBm)}; \quad \text{Equation (12)}$$

where $P_0$ is a cell-specific parameter (in dBm) including UL interference level etc., which is signaled by the eNodeB via higher layer signaling.

$SINR_{Target}$ is a WTRU (or a subset of WTRUs) specific parameter (in dB), allowing the eNodeB to set classes of service for the UE (or subset of UEs). $SINR_{Target}$ may be a function of pathloss to the serving cell and some neighboring cells. $SINR_{Target}$ can be configured by the serving eNodeB on a semi-static basis and then signaled to the UE (or subset of UEs) via higher layer signaling;

PL is the downlink pathloss (in dB);

$\lambda$ is a cell specific pathloss compensation factor for fractional power control where $0 < \alpha \leq 1$. $\alpha$ can be configured by the eNodeB on a semi-static basis and signaled via higher layer signaling;

$\Delta_{closed}$ is a power correction factor in dB which is determined based on a closed loop mechanism;

$\propto$ is a weighting factor to enable ($\propto=1$) or disable ($\propto=0$) the closed loop component, depending on the availability of the DL control channel carrying the closed loop correction command. The weighting factor is determined autonomously by the WTRU via detecting the presence of the PC correction command. It is assumed that the WTRU is informed via higher layer signaling from the eNodeB with regard to where and when the command signaling exists. For instance, in the initial UL transmission, since there may be no correct command available from the eNodeB, the WTRU sets $\propto=0$;

$\Delta_{MCS}$ is a power offset per granted MCS. Typically, the power offsets for the individual granted MCS are known by both the WTRU and the eNodeB.

Since eNodeB 30 knows the $\Delta_{MCS}$ in use at a given instance, eNodeB 30 may take out the value of $\Delta_{MCS}$ from the received PSD when it determines a correction command by comparing a resulting received PSD (or SINR) with a target level determined by network 10.

As set forth above, this disclosed method uses an absolute power correction factor compared to the open loop based PSD. As such, from Equation (12), the WTRU Tx PSD at the $n^{th}$ update instance is expressed as follows:

$$PSD_{Tx}(n) = PSD_{open}(n) + \alpha \cdot \Delta_{closed}(n) + \Delta_{MCS}(n) \quad \text{Equation (13)}$$
$$= PSD'_{Tx}(n-1) + (PSD_{open}(n) - PSD_{open}(n-1)) +$$
$$\alpha \cdot (\Delta_{closed}(n) - \Delta_{closed}(n-1)) + \Delta_{MCS}(n);$$

where $PSD'_{Tx}(n-1)$ represents the $(n-1)^{th}$ Tx PSD without the power offset per granted MCS, which is given by $PSD'_{Tx}(n-1) = PSD_{Tx}(n-1) - \Delta_{MCS}(n-1)$.

Since the total WTRU transmit power is constrained by the maximum transmit power level, denoted by $P_{max}$, of the WTRU, the total WTRU transmit power, denoted by $P_{Tx}$, is expressed as:

$$P_{Tx} = \min\{P_{max}, (10 \cdot \log_{10}(M) + PSD_{Tx})\} \text{ (dBm);} \quad \text{Equation(14)}$$

where M is the number of assigned RBs.

Accordingly, the actual WTRU transmit PSD may be represented as:

$$PSD_{Tx}^{actual} = P_{Tx} - 10 \cdot \log_{10}(M) \text{ (dBm)} \quad \text{Equation (15)}$$

It should be noted that the UL PC in Equation (15) is implemented by processor 115 of WTRU 20.

In accordance with the disclosed PC method for non-scheduled data, WTRU 20 calculates the open loop PSD as follows:

$$PSD_{open} = P_0 + SINR_{Target} + \lambda \cdot PL \text{ (dBm)} \quad \text{Equation (16)}$$

where

The target SINR, $SINR_{Target}$, may be adjusted through an outer loop mechanism at serving eNodeB 30 according to Quality of Service (QoS) (like target BLER) and be also a function of the pathloss measurements to the serving cell and neighboring cells; and PL is the filtered pathloss in dB, including shadowing, from the serving eNodeB to the WTRU. The WTRU continuously (or periodically) measures the instantaneous pathloss based on the DL RS whose transmit power is known at the WTRU. A filtering method is then applied to the pathloss measurements, such as $$PL_k = \rho \cdot PL_{k-1} + (1-\rho) \cdot PL_k \quad \text{Equation (17)}$$

where $PL_k$ and $PL_{k-1}$ represent the filtered pathloss at the $k^{th}$ instance and $(k-1)$-th instant, respectively. $L_k$ is the instantaneous pathloss at the $k^{th}$ instant. $\rho$ is a filter coefficient, $0 \leq \rho \leq 1$, which is generally determined by WTRU 20, depending on pathloss variation, fast fading rate, the time of UL transmission, etc. Alternatively, a moving averaging method may be considered for the pathloss filtering.

The closed loop component is determined by processor 115 similar to that which is disclosed above.

$$\Delta_{closed} = \lfloor ESINR_{est} - SINR_{target} \rfloor \quad \text{Equation (18)}$$

where $ESINR_{est}$ and $SINR_{target}$ denotes the effective SINR (ESINR) estimate at the receiver and target SINR, respectively, of the power controlled channel(s) in dB. [x] denotes a correction value in the correction set, which is nearest to x.

Similar to the methods disclosed above, when the correction command is signaled in the UL grant, assuming that UL HARQ is synchronous, the signaling timing configuration can be simplified such that the command signaling is done in particular UL grants such as the UL grant associated with a pre-defined HARQ process.

For non-scheduled data (e.g., VOIP), when there is no recent closed loop correction command (for example, due to recent scheduled UL data transmission, say, UL DTX), WTRU 20 may set its Tx PSD by relying on the open loop: in this case, the weighting factor, $\alpha$, in Equation (13) is set to zero as in the case of initial Tx PSD setting. WTRU 20 may alternatively set its TX PSD based on the pathloss variation between the time before the DTX and the time before resuming the UL transmission: if the UL DTX is short, the WTRU may use Equation (2) by setting $\beta$ to zero, such that $$PSD_{Tx}(n) = PSD'_{Tx}(n-1) + (PSD_{open}(n) - PSD_{open}(n-1)) + \Delta_{MCS}(n); \quad \text{Equation (19)}$$

where n is the Tx PSD setting time before resuming the UL transmission and (n–1) is the PSD setting time before the DTX. An example of this case is shown in FIG. 4.

Alternatively, WTRU 20 may apply a power offset relative to the most recent PSD for PUCCH, if available. Even though there was no UL data transmission, there may be UL control signaling (such as CQI and ACK/NACK) for DL. In this case, since the UL control channel (PUCCH) is also power controlled based on Equation (12), (but using different parameters and update rate), the UL control channel (PUCCH) Tx PSD may be used for the data channel (PUSCH) Tx PSD as follows:

$$PSD_{Tx}(PUSCH) = PSD_{Tx}(PUCCH) + \Delta_{control}(PUSCH, PUCCH); \quad \text{Equation (20)}$$

where $PSD_{Tx}(PUCCH)$ is the most recent PSD (or PSD averaged over the recent updates) for the UL control channel (PUCCH) and $\Delta_{control}(PUSCH,PUSCH)$ represent the control channel (PUCCH) power offset relative to the Tx PSD for PUSCH.

For a sounding pilot, its Tx PSD, $PSD_{Tx}(pilot)$, may be biased by a pilot power offset relative to the data TX PSD, $PSD_{Tx}(data)$, such that $$PSD_{Tx}(pilot) = PSD_{Tx}(data) + \Delta_{pilot}(data, pilot) \quad \text{Equation (21)}$$

where $\Delta_{pilot}(data, pilot)$ represent the pilot power offset which may be a WTRU-specific parameter configured by the eNodeB on a semi-static basis.

For control signaling in UL, it is preferred to use different parameters (such as target PSD) and a faster update rate than for data. In addition, we prefer that the reference channel measured for correction commands for control signaling is the control channel itself and the correction command for control is conveyed in the DL scheduling. The number of bits for the correction command for control may be different than for data, where the number of command bits may be a semi-static configurable parameter per WTRU basis. However, we may maintain a relative average power offset between the data and control channels such as $$E(PSD_{Tx}(data)) = E(PSD_{Tx}(control)) + \Delta_{control}(data, control) \quad \text{Equation (22)}$$

where $E(PSD_{Tx}(data))$ represents the average PSD for data channel in dBm;

$E(PSD_{Tx}(control))$ represents the average PSD for control channel in dBm; and $\Delta_{control}(data, control)$ is a power offset between the data channel and the control channel.

In another disclosed method of UL PC, a combined Open Loop/Closed Loop UL PC with Interference Mitigation for Shared Data Channel is used. In accordance with this method, WTRU 20 controls its transmitted PSD for UL channels. If the bandwidth allocation (e.g., RB allocation) of WTRU 20 varies, then the WTRU total transmit power varies such that the PSD is kept constant.

As described in the disclosed methods above, WTRU 20 performs open loop PC based on pathloss measurement and system parameters. WTRU 20 then corrects its PSD using some form of closed loop PC to compensate for the open loop errors. It should be noted that for each UL scheduled WTRU, CQI information is periodically signaled from eNodeB 30 for AMC and scheduling. Hence, the closed loop PC component of this disclosed method does not need any additional PC command signaled by eNodeB. In order to mitigate inter-cell interference in the neighboring cell(s), WTRU 20 incorporates an interference load indicator from the strongest neighboring cell.

In accordance with this method, for the UL shared data channel, in the initial transmission phase, WTRU 20 derives its transmitted PSD, $PSD_{Tx}$, based on DL reference signal (RS) as follows:

$$PSD_{Tx} = SINR_T + PL + IN_0 + K + \Delta(IoT_S) - 10 \cdot \log 10(BW_{RU} \cdot N); \quad \text{Equation (23)}$$

where $SINR_T$ is the target SINR in dB at serving eNodeB 30. PL is the pathloss in dB, including shadowing, from serving eNodeB 30 to WTRU 20, where WTRU 20 measures the pathloss based on the DL RS whose transmit power is known at WTRU 20 via DL Layer 2/Layer 3 signaling, $IN_0$ is the UL interference and noise power in dBm, measured at serving eNodeB 30. K is a power control margin set by serving eNodeB 30.

It is preferable that the target SINR for WTRU 20 (or a sub-group of WTRUs) is adjustable using an outer loop PC scheme according to a link quality metric (such as BLER) at serving eNodeB 30. In addition, in the case of UL Multiple In Multiple Out (MIMO), the target SINR depends also on the selected MIMO mode, which takes into account the fact that different MIMO modes require different SINR for a given link quality. $\Delta(IoT_S)$ represents the UL load control step size, which is a function of the UL interference load (e.g. interference over thermal) indicator of the strongest neighboring cell, $IoT_S$, where the strongest neighboring cell is determined at WTRU 20, based on pathloss measurements from the individual neighboring cell to WTRU 20. It is assumed that each cell 40 broadcasts an UL interference load bit periodically (similar to the relative grant in HSUPA), so that WTRU 20 can decode the indicator bit from the selected strongest neighboring cell.

For example, $\Delta(IoT_S)$ may have values as follows:

$$\Delta(IoT_S) = \begin{cases} \delta < 0, & \text{when } IoT_S = 1 \text{ or "down command"} \\ 0, & \text{when } IoT_S = 0, \text{"DTX," or "up command"} \end{cases}$$

where δ is a predefined system parameter, for example, δ=−1 or −2 dB. With the use of $A(IoT_S)$, inter-cell interference in neighboring cells can be mitigated.

Since other WTRUs at cell center inject less interference into other cells than those at cell edge, a fraction of the load control step size is considered as follows:

$$\delta = \begin{cases} \delta, & \text{for WTRUs at cell edge} \\ \dfrac{\delta}{x}, & \text{for cell interior WTRUs where } x > 1 \end{cases}$$

WTRU 20 may make a decision on whether it is at cell edge or at cell interior based on a pathloss ratio between its serving cell and the strongest neighboring cell, for example.

If (pathloss_serving_cell−pathloss_strongest_neighboring_cell)<R (dB), x=4; where R represents the virtual boundary layer between the cell interior zone and cell edge zone. The parameter R may be broadcast by eNodeB 30 semi-statically.

After the initial transmission phase, WTRU 20 $PSD_{TX}$ is calculated as follows:

$$PSD_{Tx} = SINR_T + PL + IN_0 + K + \Delta(IoT_S) + \alpha \cdot f(CQI, SINR_T) - 10 \cdot \log 10(BW_{RU} \cdot N_{RU}) \quad \text{Equation (24)}$$

where $f(CQI, SINR_T)$ is a correction factor based on the UL CQI, and the corresponding target SINR where both the CQI and the target SINR are signaled from serving eNodeB 30; α, where $0 \leq \alpha \leq 1$, is a weighting factor which may be determined according to channel conditions and CQI availability (or UL transmission pause). For instance, in the case where there is no UL CQI (UL MCS or grant information) available from eNodeB 30 due to no scheduled UL data transmission, the weighting factor, α, is set to zero, meaning that WTRU 20 relies on open loop PC only (such as PC for the random access channel (RACH)); otherwise, it is set to be less than or equal to one (1).

The correction factor, $f(CQI, SINR_T)$, in Equation 24, is used to compensate for open loop PC related errors, including the pathloss measurement error due to non-perfect reciprocity in UL and DL in FDD and WTRU 20 transmitter impairment due to non-linear WTRU transmitter power amplification. In addition, the correction factor is used to compensate for target quality mismatch due to different channel conditions. Hence, the quality of the power controlled channel(s) is maintained along with a given target quality (like target SINR).

Taking into account the fact that the UL CQI (UL MCS or grant information) represents the SINR received at eNodeB 30, the correction factor can be calculated such as, $$f(CQI, SINT_T) = SINR_T - E\{SINR_{est}(CQI)\} \text{ (dB)}; \quad \text{Equation (25)}$$

where $SINR_{est}(CQI)$ represents the eNodeB received SINR estimate, which the WTRU derives from the UL CQI feedback. $E\{SINR_{est}(CQI)\}$ denotes the estimated SINR average over time such as by the following:

$$E\{SINR_{est}(CQI^k)\} = \rho \cdot E\{SINR_{est}(CQI^{k-1})\} + (1-\rho) \cdot E\{SINR_{est}(CQI^k)\}; \quad \text{Equation (26)}$$

where $CQI^k$ represents the k-th received CQI and ρ is the averaging filter coefficient, $0 \leq \rho \leq 1$.

The correction factor, given above, in Equation (25), by the difference between the target SINR and the estimated SINR (derived from the reported CQIs), represents the open loop PC related errors which need to be compensated.

The WTRU total transmit power should be within the maximum power level, $P_{max}$, and the minimum power level, $P_{min}$, in dBm, respectively, where the maximum and minimum power levels are determined based on WTRU class.

eNodeB 30 preferably signals parameters, including a target SINR level, $SINR_T$, which is a WTRU (or a sub-group of WTRUs)-specific parameter, where the target SIR may be adjusted through an outer loop mechanism based on QoS like target BLER. The target SINR may be also a function of the pathloss measurement. The signaling of the target SIR is done via in-band L1/2 control signaling upon its adjustment. A power control margin, K, which is an eNodeB-specific parameter is also signaled by eNodeB 30. K is preferably semi-static and signaled via the broadcast channel (BCH). It should be noted that even though K is assumed to be separately signaled along with the other parameters, it may be embedded in the target SINR, i.e., $SINR_T$ (after embedding)=$SINR_T$+K (dB). In this case, explicit signaling of K to WTRU 20 is not required.

eNodeB 30 further signals a total UL interference and noise level, $IN_0$, which is averaged across all the sub-carriers (or RBs) in use, or a subset of the sub-carriers. This parameter is preferably derived by serving eNodeB 30 (and possibly signaled via BCH). The update rate for this signaling is generally relatively slow. The maximum and minimum UL power level, $P_{max}$ and $P_{min}$ is also signaled by eNodeB 30. Which each may be WTRU capability dependent parameters, or may be expressly signaled by eNodeB 30.

A UL channel quality indicator, CQI (e.g. UL MCS or grant information), which is signaled originally for the purpose of UL AMC (with a maximum signaling rate of once per TTI, e.g. 1000 Hz).

A CQI mapping rule (or bias between CQI and measured SINR), which the eNodeB uses for CQI feedback generation. This rule or parameter may be combined into the target SINR. In this case, explicit signaling of the rule (or parameter) is not required.

An UL interference load indicator from each eNodeB.

The semi-static parameter R which represents the virtual boundary layer between the cell interior zone and cell edge zone.

The disclosed PC method do not require additional feedback PC commands other than the above listed system parameters including the target SINR, cell interference/noise level, and reference signal transmit power and constant value, which can be broadcast (or directly signaled) to WTRUs on a slow rate basis.

It is designed to be flexible and adaptive to dynamic system/link parameters (target SINR and inter-cell interference loading condition) and channel conditions (path loss and shadowing), in order to achieve the E-UTRA requirements.

Further, this disclosed method is compatible with other link adaptation schemes such as AMC, HARQ, and adaptive MIMO.

In an alternative method of inter-cell interference mitigation, instead of broadcasting an interference load indicator from each eNodeB, serving eNodeB 30 may co-ordinate inter-cell interference levels with other cells 40 and incorporate them through adjusting the target SIR, power control margin K or possibly $P_{max}$ accordingly.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit receive unit (WTRU), the method comprising:
   receiving signaling indicating an uplink (UL) resource assignment, a power control (PC) correction command and an assigned modulation coding set (MCS); and
   applying a transmit power to an UL transmission, wherein the transmit power is based on a combination of a bandwidth of the UL resource assignment, an open loop PC component, a closed loop PC component and a delta factor related to an offset value, wherein:
      the open loop PC component is based on pathloss and open loop PC parameters;
      the closed loop PC component includes a correction factor;
      the correction factor is based on the PC correction command; and
      the offset value is related to the assigned MCS.

2. The method of claim 1, wherein applying a transmit power comprises:
   applying, to the UL transmission, a minimum of a maximum transmit power level and the transmit power based on a combination of a bandwidth of the UL resource assignment, an open loop PC component, a closed loop PC component and a delta factor related to an offset value.

3. The method of claim 2, wherein the maximum transmit power level is based on at least one of (i) a power class of the WTRU, and (ii) a capability of the WTRU.

4. The method of claim 2, further comprising:
   receiving signaling indicating the maximum transmit power level.

5. The method of claim 1, wherein the signaling comprises an UL grant, and wherein the UL grant is associated with a Hybrid Access Repeat Request (HARQ) process.

6. The method of claim 1, wherein applying the transmit power comprises:

applying the transmit power in accordance with a timing of a Hybrid Access Repeat Request (HARQ) process.

7. The method of claim 6, wherein applying the transmit power in accordance with a timing of the HARQ process comprises:
applying the transmit power at a next transmission time of the HARQ process following reception of an UL grant.

8. The method of claim 1, wherein the signaling comprises an UL grant associated with a Hybrid Access Repeat Request (HARQ) process, and wherein applying the transmit power comprises:
applying the transmit power at a next transmission time of the associated HARQ process following reception of the UL grant.

9. The method of claim 1, wherein the open loop PC parameters comprise at least one of a cell-specific parameter and a WTRU-specific parameter.

10. The method of claim 1, wherein the correction factor is zero (0) in an initial uplink transmission.

11. The method of claim 1, wherein the UL transmission comprises any of (i) data, (ii) a combination of data and control information, and (iii) feedback information.

12. The method of claim 1, wherein the correction factor being based on the PC correction command comprises the correction factor being based on an accumulation of multiple PC correction commands including the PC correction command.

13. A wireless transmit receive unit (WTRU) comprising a processor configured to:
receive signaling indicating an uplink (UL) resource assignment, a power control (PC) correction command and an assigned modulation coding set (MCS); and
apply a transmit power to an UL transmission, wherein the transmit power is based on a combination of a bandwidth of the UL resource assignment, an open loop PC component, a closed loop PC component and a delta factor related to an offset value, wherein:
the open loop PC component is based on pathloss and open loop PC parameters;
the closed loop PC component includes a correction factor;
the correction factor is based on the PC correction command; and
the offset value is related to the assigned MCS.

14. The WTRU of claim 13, wherein the processor being configured to apply a transmit power comprises the processor being configured to:
apply, to the UL transmission, a minimum of a maximum transmit power level and the transmit power based on a combination of a bandwidth of the UL resource assignment, an open loop PC component, a closed loop PC component and a delta factor related to an offset value.

15. The WTRU of claim 14, wherein the maximum transmit power level is based on at least one of (i) a power class of the WTRU, and (ii) a capability of the WTRU.

16. The WTRU of claim 14, wherein the processor is configured to:
receive signaling indicating the maximum transmit power level.

17. The WTRU of claim 13, wherein the signaling comprises an UL grant, and wherein the UL grant is associated with a Hybrid Access Repeat Request (HARQ) process.

18. The WTRU of claim 13, wherein the processor is configured to:
apply the transmit power in accordance with a timing of a Hybrid Access Repeat Request (HARQ) process.

19. The WTRU of claim 18, wherein the processor is configured to:
apply the transmit power at a next transmission time of the HARQ process following reception of an UL grant.

20. The WTRU of claim 13, wherein the signaling comprises an UL grant associated with a Hybrid Access Repeat Request (HARQ) process, and wherein the processor is configured to:
apply the transmit power at a next transmission time of the associated HARQ process following reception of the UL grant.

21. The WTRU of claim 13, wherein the open loop PC parameters comprise at least one of a cell-specific parameter and a WTRU-specific parameter.

22. The WTRU of claim 13, wherein the correction factor is zero (0) in an initial uplink transmission.

23. The WTRU of claim 13, wherein the UL transmission comprises any of (i) data, (ii) a combination of data and control information, and (iii) feedback information.

24. The WTRU of claim 13, wherein the correction factor being based on the PC correction command comprises the correction factor being based on an accumulation of multiple PC correction commands including the PC correction command.

* * * * *